United States Patent
Roychoudhury et al.

(10) Patent No.: US 9,751,653 B2
(45) Date of Patent: Sep. 5, 2017

(54) FREEZE EXPANSION SURFACE PROFILE

(75) Inventors: Raj Roychoudhury, Bloomfield Hills, MI (US); Bogdan Ispas, North York (CA); Babak Fana, Mississauga (CA); Nilesh Patel, Etobicoke (CA)

(73) Assignee: ABC Group, Inc., Toronto, ON (CA)

( * ) Notice: Subject to any disclaimer, the term of this patent is extended or adjusted under 35 U.S.C. 154(b) by 0 days.

(21) Appl. No.: 14/126,853

(22) PCT Filed: Jun. 28, 2012

(86) PCT No.: PCT/US2012/044509
§ 371 (c)(1),
(2), (4) Date: Dec. 17, 2013

(87) PCT Pub. No.: WO2013/003523
PCT Pub. Date: Jan. 3, 2013

(65) Prior Publication Data
US 2014/0110419 A1    Apr. 24, 2014

Related U.S. Application Data

(60) Provisional application No. 61/502,119, filed on Jun. 28, 2011.

(51) Int. Cl.
*B65D 1/40* (2006.01)
*B65D 1/42* (2006.01)
(Continued)

(52) U.S. Cl.
CPC ............ *B65D 1/40* (2013.01); *B65D 1/0223* (2013.01); *B65D 1/42* (2013.01); *B65D 79/005* (2013.01);
(Continued)

(58) Field of Classification Search
CPC ...... B65D 79/005; B65D 1/40; B65D 1/0223; B65D 1/42; B65D 11/06; B65D 2501/0081; B65D 2501/0036; B29C 49/20
(Continued)

(56) References Cited

U.S. PATENT DOCUMENTS 3,940,002 A    2/1976  Schiemann
5,064,081 A *  11/1991 Hayashi .............. B65D 1/0223
                                                    215/373
(Continued)

FOREIGN PATENT DOCUMENTS

CN    2651091    10/2004
CN    2758673    2/2006
(Continued)

OTHER PUBLICATIONS

International Search Report and Written Opinion, PCT/US2012/044509, Sep. 7, 2012.
(Continued)

*Primary Examiner* — Andrew Perreault
(74) *Attorney, Agent, or Firm* — Medler Ferro Woodhouse & Mills PLLC

(57) ABSTRACT

A volume expansion feature for a fluid reservoir is provided, the volume expansion feature comprising a central recess, a plurality of channels extending from the central recess, where the central recess and the channels are positioned at least in part in a recessed surface profile. The recessed surface profile is reversibly moveable from a first inwardly directed configuration, to a second outwardly directed configuration. The central recess and the channels are configured to impart an inward bias to maintain the recessed surface profile in the first inwardly directed configuration under standard loading of the fluid reservoir. Upon increased
(Continued)

pressure within the fluid reservoir, the recessed surface profile extends to the second outwardly directed configuration, thereby increasing the volume of the fluid reservoir.

11 Claims, 2 Drawing Sheets

(51) Int. Cl.
  *B65D 1/02* (2006.01)
  *B65D 79/00* (2006.01)
  *B60S 1/50* (2006.01)
(52) U.S. Cl.
  CPC ......... *B60S 1/50* (2013.01); *B65D 2501/0081* (2013.01)
(58) Field of Classification Search
  USPC ........ 220/720, 721, 722; 215/379, 382, 381, 215/384, 385, 383
  See application file for complete search history.

(56) References Cited

U.S. PATENT DOCUMENTS

| | | | |
|---|---|---|---|
| 7,017,763 B2 | 3/2006 | Kelley | |
| 8,256,634 B2 * | 9/2012 | Tanaka | B65D 1/0223 215/379 |
| 8,529,975 B2 * | 9/2013 | Trude | B65D 1/0276 215/371 |
| 2002/0153343 A1 * | 10/2002 | Tobias | B65D 1/0284 215/375 |
| 2004/0134920 A1 | 7/2004 | Baron | |
| 2005/0133620 A1 | 6/2005 | Kim | |
| 2007/0199915 A1 | 8/2007 | Denner et al. | |
| 2008/0245762 A1 | 10/2008 | Matsuoka et al. | |
| 2010/0000962 A1 | 1/2010 | Lepoitevin et al. | |

FOREIGN PATENT DOCUMENTS

| | | |
|---|---|---|
| CN | 101018660 | 8/2007 |
| CN | 101678911 A | 3/2010 |
| JP | 2003063516 | 3/2003 |
| JP | 2005096850 | 4/2005 |
| JP | 2009120107 | 6/2009 |

OTHER PUBLICATIONS

"Extended European Search Report", European patent application 12 804 511.9.

SIPO Chinese Search Report, CN Appl. No. 201280031771.6, Feb. 17, 2015.

* cited by examiner

US 9,751,653 B2

FREEZE EXPANSION SURFACE PROFILE

CROSS-REFERENCE TO RELATED APPLICATION

This application claims benefit under 35 U.S.C. §119(e) to U.S. Provisional Patent Application No. 61/502,119 filed Jun. 28, 2011, which is incorporated by reference herein in its entirety.

FIELD OF THE INVENTION

The present invention relates to fluid reservoirs, and in particular to an expansion feature incorporated into the fluid reservoir to provide additional volume to the reservoir in the event of freezing of the liquid contained therein.

BACKGROUND OF THE INVENTION

The expansion of water or other aqueous solutions upon freezing results in a larger volume requirement for a fluid reservoir, possibly leading to component failure from containment wall failure (e.g. bursting, cracking, leaking) or accessories being ejected due to pressure (e.g. fluid pumps held in by grommets popping out of required position, level sensors behaving similarly). When implemented in vehicles, limited under hood space often does not allow for conventional isolating air pocket designs, thus necessitating a space efficient alternative.

SUMMARY OF THE INVENTION

According to an aspect of an embodiment, provided is a volume expansion feature for a fluid reservoir, the volume expansion feature comprising a central recess, a plurality of channels extending from the central recess, where the central recess and the channels are positioned at least in part in a recessed surface profile. The recessed surface profile is reversibly moveable from a first inwardly directed configuration, to a second outwardly directed configuration. The central recess and the channels are configured to impart an inward bias to maintain the recessed surface profile in the first inwardly directed configuration under standard loading of the fluid reservoir. Upon increased pressure within the fluid reservoir, the recessed surface profile extends to the second outwardly directed configuration, thereby increasing the volume of the fluid reservoir.

According to another aspect of an embodiment, provided is a fluid reservoir, the fluid reservoir comprising a primary holding tank defining the fluid reservoir, and a volume expansion feature incorporated into at least one wall structure of the fluid reservoir. The volume expansion feature provides a central recess and a plurality of channels extending therefrom. The central recess and the channels are positioned at least in part in a recessed surface profile, the recessed surface profile being reversibly moveable from a first inwardly directed configuration to define a first volume of the fluid reservoir, to a second outwardly directed configuration to define a second volume of the fluid reservoir, the second volume being greater than the first volume. The central recess and the channels are configured to impart an inward bias to maintain the recessed surface profile in the first inwardly directed configuration under standard loading of the fluid reservoir. Upon increased pressure within the fluid reservoir, the recessed surface profile extends to the second outwardly directed configuration.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS OF THE PRESENT INVENTION

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the formation/use of expandable features in fluid reservoirs (e.g. washer bottles) relating to windscreen-washing systems, the invention may also be used in other container-based arrangements where it is deemed useful. Furthermore, there is no intention to be bound by any expressed or implied theory presented in the preceding technical field, background, brief summary or the following detailed description.

Figure 1:
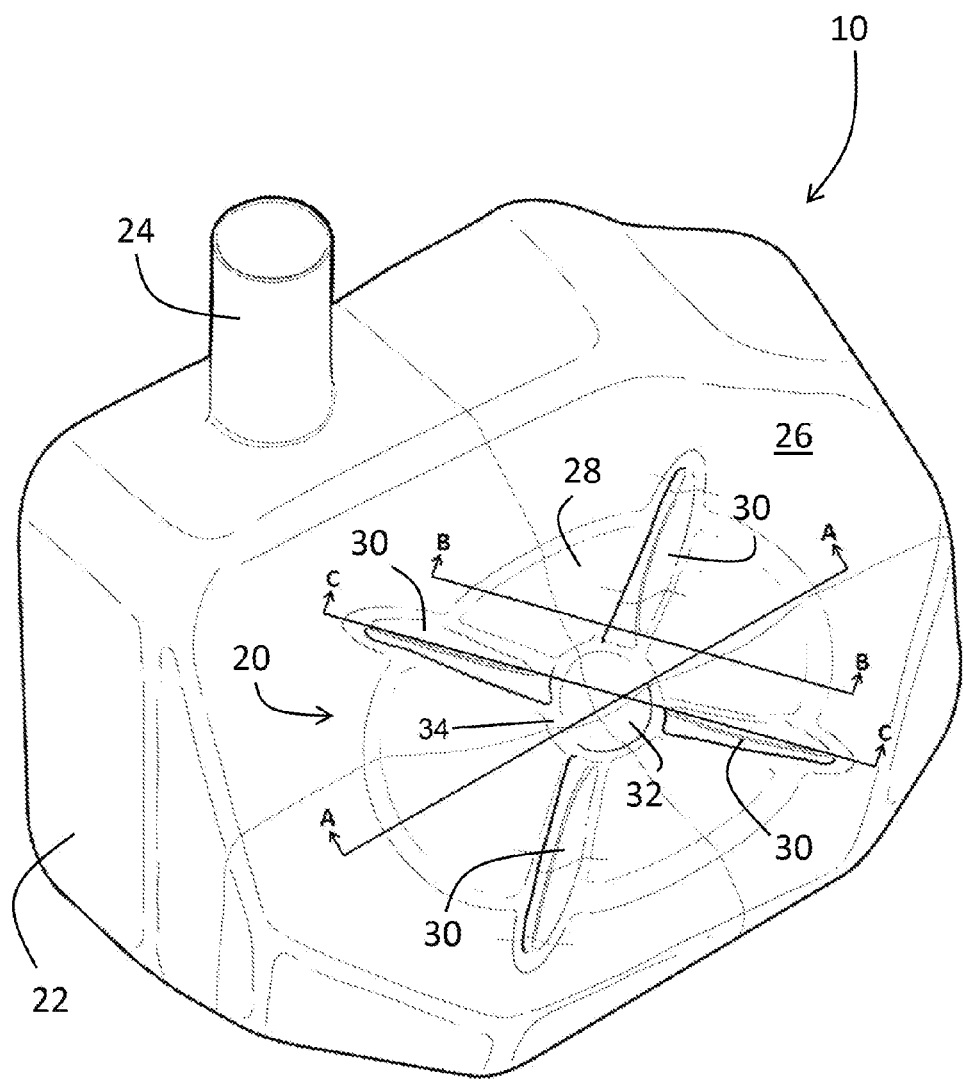
FIG. 1 is a perspective view of the fluid reservoir according to one exemplary embodiment.

Referring to FIG. 1, a perspective view of an exemplary fluid reservoir 10 having a freeze-event expansion feature 20 according to the present invention is illustrated. Fluid reservoir 10 is generally associated with an automotive windscreen-washing system comprising one or more pumps, an exit circuit for directing fluid to the windscreen and in some systems additional sensory components and/or floats for obtaining operational information. Fluid reservoir 10 may take on a range of configurations, depending on the installation and space available in the vehicle.

Fluid reservoir 10 provides a primary holding tank 22 and an associated fill tube 24 that generally terminates in a region of the engine compartment accessible to the vehicle operator. In a windscreen washing system, fluid reservoir 10 will often contain a water-based cleaning solution. On exposure to sub-zero (e.g. freezing) temperature, the water-based cleaning solutions may freeze, resulting in a volume expansion with potentially damaging effect.

Figure 2:
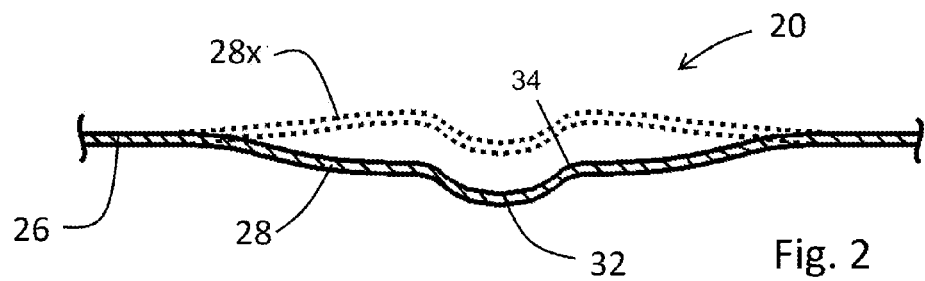
FIG. 2 presents a cross-sectional view of the expansion feature, taken at Section A-A.
Figure 4:
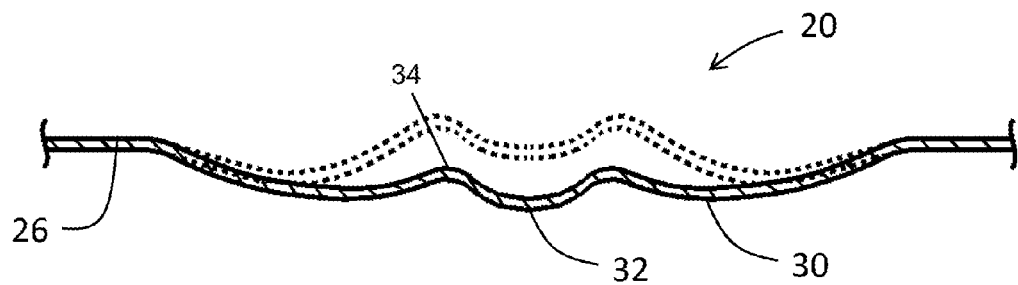
FIG. 4 presents a cross-sectional view of the expansion feature, taken at Section C-C.

To accommodate volume expansion due to freezing, at least one freeze-event expansion feature 20 is incorporated into the wall structure 26 of the primary holding tank 22 portion of fluid reservoir 10. Expansion feature 20 is configured as a recessed surface profile 28 having a pattern of internally-recessed channels 30 separated from a central recess 32 by a raised feature 34 therebetween, as shown in FIGS. 1, 2 and 4. Central recess 32 is generally centrally located with respect to recessed surface profile 28. Channels 30 extend radially outward relative to the central recess 32, and as shown in the exemplary embodiment of FIG. 1, may extend beyond the outer boundaries of recess surface profile 28. In other words, channels 30 are positioned at least in part in recessed surface profile 28.

Figure 3:
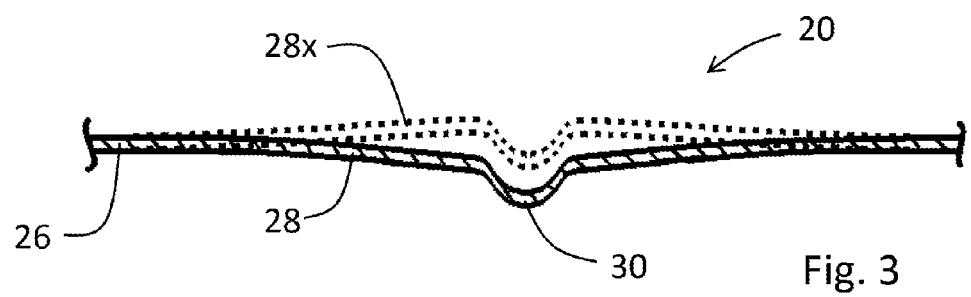
FIG. 3 presents a cross-sectional view of the expansion feature, taken at Section B-B.

Channels 30 and central recess 32 are configured to provide sufficient localized resistance to wall structure 26, in particular recessed surface profile 28 such that under standard loading conditions, expansion feature 20, and in particular recessed surface profile 28 remains in an inwardly directed configuration, for example as shown (in solid line) in each of FIGS. 2 and 3. In other words, under normal liquid state conditions, wall structure 26, central recess 32 and channels 30 are sufficiently rigid to provide resistance to expansion, thus keeping the volume of fluid reservoir 10 constant (herein referred to as volume V1). Under conditions of freezing and the associated increase in internal pressure, wall structure 26 and channels 30 provide sufficient flex to permit recessed surface profile 28 to modify into an outwardly directed configuration 28x, for example as shown (in dotted line) in each of FIGS. 2 and 3. In the outwardly directed configuration, the internal volume of fluid reservoir 10 is increased (herein referred to as volume V2), thus reducing the potential for destructive internal pressures due to freezing of the liquid contained therein. Accordingly, the recessed surface profile 28 exhibits a pressure based surface position equilibrium, depending on internal bottle pressure, with the profiles depicted in solid line in each of FIGS. 2 and 3 occurring under normal liquid state conditions, and the profiles depicted in dotted line occurring under frozen liquid state conditions. FIG. 4 presents an alternate cross-section through central recess 32 and channels 30, further demonstrating this pressure based surface position equilibrium. In general, on experiencing a freeze-event and increased internal pressure, freeze-event expansion structure 20 permits a reversible volume change of fluid reservoir 10 from V1 to V2, where V2>V1, and the increase in volume per expansion feature used is generally in the range of 1% to 15% of V1.

As stated above, the recessed surface profile 28 exhibits a pressure based surface position equilibrium, depending on internal bottle pressure. Where fluid reservoir 10 is in the expanded state, that is having a volume corresponding to V2, on thawing of the fluid contents contained therein and a reduction in internal pressure, expansion feature 20, and in particular the outwardly directed surface profile (denoted as 28x in dot) returns to the inwardly directed configuration, thus returning fluid reservoir 10 to a volume corresponding to V1. In other words, the expansion of fluid reservoir 10 from V1 to V2 is a repeatably reversible process, permitting fluid reservoir 10 to accommodate many freeze/thaw cycles of liquid contained therein. To permit this, channels 30 and central recess 32 incorporated into expansion feature 20 impart a return force upon recessed surface profile 28 biasing expansion feature 20 into the inwardly directed configuration. As shown in FIG. 4, in the outwardly directed configuration, channels 30 and central recess 32 in expansion feature 20 remain in the inwardly directed configuration, while surface profile 28x extends outwardly (as best seen in FIGS. 2 and 3) to accommodate internal pressure. As such, channels 30 and central recess 32 provide a return force to expansion feature 20 to return it to the inwardly directed configuration. In addition, to further facilitate the repeatable reversible process of accommodating increased internal pressure, fluid reservoir 10 may be constructed of a thermoplastic material capable of exhibiting a memory behaviour. Exemplary suitable thermoplastic materials include, but are not limited to, polypropylene, thermoplastic polyolefins (TPO), acrylonitrate-butadiene-styrene (ABS), polycarbonate (PC), polybutadiene terephthalate (PBT), polyethylene terephthalate (PET), nylon, polyvinyl chloride (PVC), polystyrene (PS), polyethylene (PPE), thermoplastic polyolefin (TPO), and blends of the above materials with other suitable materials.

As will be appreciated, fluid reservoirs may be formed using a range of thermoplastic molding technologies, including but not limited to blow-molding, injection molding and twin-sheet thermoforming.

In some embodiments, expansion feature 20 may be a separately formed component fitted to fluid reservoir 10. In such instances, expansion feature 20 may be made of a different material in relation to fluid reservoir 10. This may be particularly advantageous where a certain material is well suited in terms of memory behaviour for expansion feature 20, yet is unsuitable for the remainder of fluid reservoir 10 having regards to material properties, and/or cost.

In the embodiment shown in FIG. 1, expansion feature 20 is provided with 4 radial channels 30 extending from a central recess 32. While depicted as such, a lesser or greater number of channels may be implemented, depending on the desired pressure based surface position equilibrium. In addition, the recessed surface profile 28 may be sized differently in respect to one or both of width and depth to achieve a different volume differential ($\Delta V=V2-V1$). For example, where an increased volume differential $\Delta V$ is desired, width and/or depth of surface profile 28 may be increased. Increasing the number of expansion features 20 will also provide control in establishing a desired volume differential. In some embodiments, as an alternate to the radial configuration, one or more annular channels may be implemented.

The expansion feature described herein provides additional volume capacity when internal pressures reach a critical threshold, due primarily to liquids freezing therein. The arrangement of the recessed surface profile and the internally directed channels in the expansion feature eliminates the need for a permanent allotment of space in the engine compartment, for example for positioning a conventional air pocket. In addition, the arrangement may also serve to reduce sloshing of fluid, as this is often associated with a conventional air pocket component, now eliminated.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-descried exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. A fluid reservoir configured for installation within an engine compartment and for use with an automotive windscreen-washing system, the fluid reservoir having a volume expansion feature comprising:
   a central recess;
   a plurality of recessed channels radially extending relative to said central recess, wherein each of the plurality of recessed channels has an inward end, which is separated from said central recess by a respective portion of a raised feature, and an outward end; and a recessed surface profile in which said central recess and a portion of each of said recessed channels are positioned, said central recess and said portion of each of said recessed channels being recessed within, and being recessed relative to, the recessed surface profile, wherein at least the outward end of each recessed channel is disposed beyond a perimeter of the recessed surface profile, wherein each of said central recess, said plurality of recessed channels, said raised feature, and said recessed surface profile are provided in a wall structure of said fluid reservoir, said recessed surface profile being configured to provide a repeatable reversible movement with respect to said wall structure between a first inwardly directed configuration and a second outwardly directed configuration, wherein said central recess and said recessed channels are configured to impart an inward bias to maintain said recessed surface profile in said first inwardly directed configuration relative to said wall structure under standard loading of said fluid reservoir, wherein upon increased pressure within said fluid reservoir, said recessed surface profile extends to said second outwardly directed configuration relative to said wall structure, thereby increasing a volume of said fluid reservoir, wherein when said recessed surface profile is in said second outwardly directed configuration said central recess and said recessed channels remain recessed relative to said recessed surface profile, and wherein upon reduction of the increased pressure within said fluid reservoir, said inward bias provided by said central recess and said recessed channels returns said recessed surface profile from said second outwardly directed configuration to said first inwardly directed configuration.

2. The fluid reservoir of claim 1, wherein said plurality of channels is four channels extending from said central recess.

3. The fluid reservoir of claim 1, wherein the volume expansion feature is a separately formed component that is fitted to the fluid reservoir.

4. The fluid reservoir of claim 1, wherein the volume expansion feature is formed of a thermoplastic material having a memory behavior selected from the group consisting of polypropylene, acrylonitrate-butadiene-styrene (ABS), polycarbonate (PC), polybutadiene terephthalate (PBT), polyethylene terephthalate (PET), nylon, polyvinyl chloride (PVC), polystyrene (PS), polyethylene (PPE), and thermoplastic polyolefin (TPO).

5. An automotive windscreen washer bottle configured for installation within an engine compartment and for use with an automotive windscreen-washing system, the automotive windscreen washer bottle comprising:

a primary holding tank defining a fluid reservoir of the automotive windscreen washer bottle, the primary holding tank configured to be installed within an engine compartment of a vehicle; and a volume expansion feature incorporated into a wall structure of said primary holding tank, said volume expansion feature having a recessed surface profile, a central recess, a raised feature, and a plurality of recessed channels radially extending relative to said central recess, wherein each of the plurality of recessed channels has an inward end, which is separated from said central recess by a respective portion of the raised feature, and an outward end, wherein said central recess and a portion of each of said recessed channels are positioned and recessed within, and recessed relative to, said recessed surface profile, wherein at least the outward end of each recessed channel is disposed beyond a perimeter of the recessed surface profile, said recessed surface profile being configured to provide a repeatable reversible movement between a first inwardly directed configuration relative to said wall structure to define a first volume of the primary holding tank and a second outwardly directed configuration relative to said wall structure to define a second volume of the primary holding tank, said second volume being greater than said first volume, and wherein said central recess and said recessed channels are configured to impart an inward bias to maintain said recessed surface profile in said first inwardly directed configuration under standard loading of the primary holding tank, and wherein upon increased pressure within the primary holding tank said recessed surface profile extends to said second outwardly directed configuration, wherein when said recessed surface profile is in said second outwardly directed configuration said central recess and said recessed channels remain recessed relative to said recessed surface profile, and wherein upon reduction of the increased pressure within the primary holding tank, said inward bias provided by said central recess and said recessed channels returns said recessed surface profile from said second outwardly directed configuration to said first inwardly directed configuration.

6. The automotive windscreen washer bottle of claim 5, wherein said plurality of channels is four channels extending from said central recess.

7. The automotive windscreen washer bottle of claim 5, wherein said volume expansion feature is a separately formed component that is fitted to said primary holding tank.

8. The automotive windscreen washer bottle of claim 5, wherein said volume expansion feature is formed of a thermoplastic material having a memory behavior selected from the group consisting of polypropylene, acrylonitrate-butadiene-styrene (ABS), polycarbonate (PC), polybutadiene terephthalate (PBT), polyethylene terephthalate (PET), nylon, polyvinyl chloride (PVC), polystyrene (PS), polyethylene (PPE), and thermoplastic polyolefin (TPO).

9. The automotive windscreen washer bottle of claim 5, further comprising:

a fill tube coupled to the primary holding tank.

10. A fluid reservoir configured for use with an automotive windscreen-washing system, the fluid reservoir comprising:

a wall structure having a volume expansion feature, the volume expansion feature having a first surface recessed relative to the wall structure and forming a recessed surface profile of the volume expansion feature, a second surface recessed within, and recessed relative to, the first surface and forming a central recess of the volume expansion feature recessed within, and recessed relative to, the recessed surface profile, and a plurality of third surfaces at least partially recessed within, and recessed relative to, the first surface and separated from the second surface, the plurality of third surfaces forming a plurality of channels of the volume expansion feature, wherein a portion of each of the plurality of channels is recessed within, and recessed relative to, the recessed surface profile, and the plurality of channels extend radially relative to the central recess of the volume expansion feature, wherein at least an outward end of each channel is disposed beyond a perimeter of the recessed surface profile, wherein the recessed surface profile of the volume expansion feature permits a repeatable and reversible volume change of the fluid reservoir, such that upon increased pressure within the fluid reservoir the recessed surface profile of the volume expansion feature extends to a second outwardly directed configuration relative to the wall structure to thereby increase a volume of the fluid reservoir, and such that upon reduction of the increased pressure within the fluid reservoir an inward bias provided by the central recess and the plurality of channels of the volume expansion feature returns the recessed surface profile from the second outwardly directed configuration to a first inwardly directed configuration, and wherein at least the volume expansion feature of the fluid reservoir is formed of a thermoplastic material having a memory behavior to facilitate the repeatable and reversible movement of the recessed surface profile between the first inwardly directed configuration and the second outwardly directed configuration.

11. The fluid reservoir of claim 10, where the central recess and the plurality of channels of the volume expansion feature remain recessed relative to the recessed surface profile of the volume expansion feature in the second outwardly directed configuration.

* * * * *